Oct. 19, 1943.   A. H. SCHUTTE   2,331,938
CATALYSIS
Filed Aug. 26, 1941
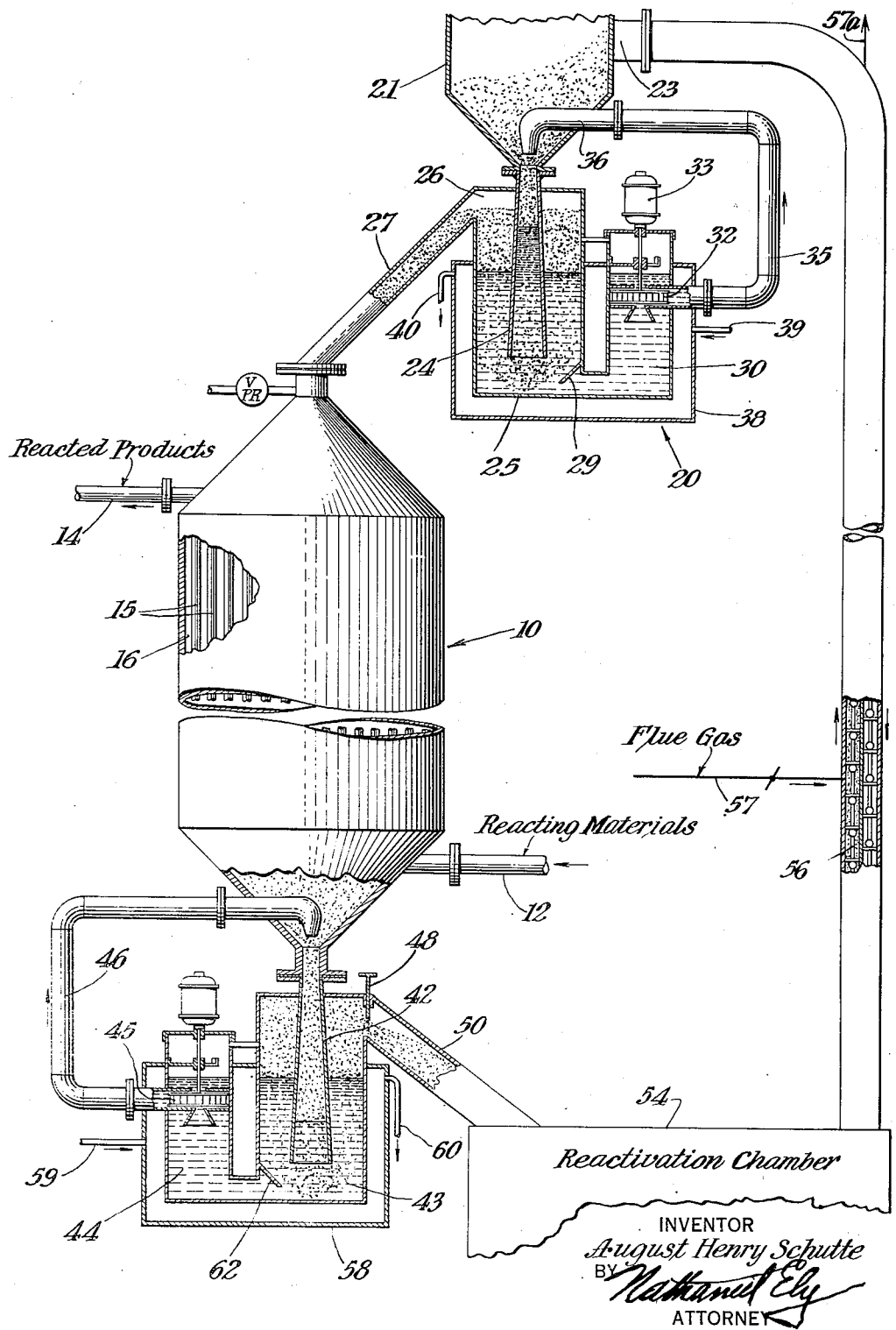
INVENTOR
August Henry Schutte
BY Nathaniel Ely
ATTORNEY Patented Oct. 19, 1943

2,331,938

UNITED STATES PATENT OFFICE 2,331,938

CATALYSIS

August Henry Schutte, Tuckahoe, N. Y., assignor to The Lummus Company, New York, N. Y., a corporation of Delaware Application August 26, 1941, Serial No. 408,296

7 Claims. (Cl. 196—52)

This invention relates to the transfer of granular materials into and out of pressure-tight chambers and more particularly relates to an improved apparatus for conveying a granular catalyst in a continuous stream into and out of a catalytic reaction zone without loss or contamination of the reactants. It is a modification of and improvement on the invention described in my prior application, S. N. 302,278, filed November 1, 1939, and entitled Method of and apparatus for effecting catalysis and which has become U. S. Patent 2,268,535.

In my previously filed application I have referred to the well known use of catalysts whereby desired chemical reactions can be accelerated or can be carried out at lower temperatures or lower pressures or can be accomplished in a more selective manner. The invention described therein is concerned with the method of carrying out a catalytic reaction in which both the catalyst and the reacting materials flow continuously, and preferably in counter-current direction, through a reaction chamber, so that there is a continuous introduction of fresh catalyst, which is brought into contact with the partially reacted products to obtain the greatest yields. Simultaneously the fouled or partially contaminated catalyst is continuously removed from the reaction chamber to a reactivation zone or to discharge.

I have also emphasized the importance of preventing the contamination of the reacting materials in the catalyst chamber due to the accidental introduction of outside gaseous products. It is of course essential to prevent the loss of the reacting products not only because of waste but because of their inflammable character in many instances. This object was accomplished by providing a liquid seal at both the catalyst inlet and the catalyst outlet, which was sufficient to prevent the loss of pressure from the reaction chamber. Conveyors were provided for transferring the catalyst through this seal. The liquid of the seal was preferably molten lead, which is especially satisfactory for hydrocarbon reactions which are normally carried out at elevated temperatures and frequently in the presence of a granular catalyst such as one of the aluminum silicates. The lead is non-wetting with respect to such catalytic material and is inert and is of sufficient density so that it will resist the normal operating pressures encountered in this type of work with a reasonable liquid seal depth.

The principal object of my present invention is to provide a continuously moving liquid seal which assists in carrying the catalytic material into the reaction chamber and which may also be used to continuously remove the fouled catalyst from the chamber, such seal being inert and non-wetting with respect to the catalyst.

Another object of the invention is to provide a column of a relatively dense liquid which forms a seal for the catalyst chamber and may be used to assist the flow of the catalyst into or out of the chamber.

Another object of the invention is to reduce the size and cost of sealing apparatus which will permit free movement of the catalyst into and out of a catalyst chamber but will substantially prevent the loss of any reactants.

Further objects and advantages of my invention will be apparent from the following description of a preferred form of embodiment thereof taken in connection with the attached drawing, which is a diagrammatic elevational view showing the catalyst reaction chamber together with feed and discharge units for the catalyst with parts in section.

In accordance with this preferred form of embodiment of my invention, the catalyst chamber is generally shown at 10 and is adapted to receive reacting materials through the line 12, which reacting materials will react in passing through the chamber, and the reacted products will discharge at the line 14. The catalyst chamber is of any particular size or shape desired for the reaction to be carried out, but it is to be understood that, in many of the petroleum reactions, particularly in the cracking of gasoline, the chambers are relatively large, being as great as twenty feet in diameter and thirty or forty feet in height. Such chambers may be provided with tubes 15, through which the catalyst passes in countercurrent flow to the reacting vapors for the most intimate effect. It is also to be understood that the space indicated at 16 between the tubes is usually provided for the circulation of a temperature control material, such as molten salt, the details of operation of which are not shown but are well known in the art. The chamber 10 may be open if no heat of reaction is supplied or removed.

The introduction of catalyst into the catalyst chamber 10 and its removal after having become partially fouled or contaminated comprise the particular feature of my present invention. The feeding means is more particularly indicated at 20. It includes a hopper-like chamber 21, into which the catalyst is introduced as from the line 23, and the catalyst discharges through flared nozzle 24 into a sealed receiver generally indicated at 25, such receiver being preferably filled with a liquid which is non-reacting and non-wetting with respect to the particular catalyst used.

The catalyst, being of a relatively light character with respect to the sealing liquid, will float to the top of the liquid as indicated in the section 26 and will then discharge down the inclined inlet 27 into the top of the reaction chamber 10. The seal for the nozzle 24 on the catalyst hopper 21 is such that the vapors cannot pass backward through the inlet 27 and into the catalyst hopper 21.

The catalyst moves positively through the nozzle 24 with the aid of the sealing liquid. This liquid is continuously recirculated, which operation may be accomplished in accordance with my invention by conducting the liquid from the tank 25, under baffle 29 to separate the catalyst, and thence into secondary chamber 30. The liquid, being maintained at the desired level, will then be picked up by the impeller 32 driven by the motor 33 and will be discharged through the conduit 35 into the nozzle 36. Nozzle 36 may be placed adjacent the discharge opening of the catalyst chamber 21; and, if the liquid is discharged through it, the liquid will serve as a jet to forcibly carry the catalyst into receiver 25. In either case, the liquid moving through the flared nozzle 24 forms an effective gas seal to prevent gas loss. The rate at which the impeller is driven may be used to control the rate of feed of catalyst.

I have found that the liquid used to effect the seal should have certain characteristics and should be selected with regard to the particular operating conditions and the particular reaction. It should have a melting point sufficiently below and a boiling point sufficiently above the reaction temperatures so that slight temperature variations within the catalyst chamber will not alter its physical state. It is desirable to use a liquid having a high specific gravity such that the necessary liquid head to balance the differential pressure can be maintained within a reasonable height. The specific gravity of the liquid should preferably be greater than that of the catalyst so that the catalyst does not accumulate at the low point of the seal. The liquid should not wet or adhere to the catalyst particles in any way, and it should not react chemically with the catalyst; otherwise, the catalytic reaction may not be satisfactorily carried out, or the activity of the catalyst may be adversely affected. It is also preferable that gases dissolve in the liquid to a negligible extent.

Certain metals have been found especially suitable as the liquid sealing agent since most catalytic reactions must be carried out at elevated temperatures. Metals having a high specific gravity and a relatively low melting point such as lead, are especially useful when the reaction requires a pressure substantially in excess of atmospheric. Molten lead is also found most satisfactory for use with bauxite and similar clay-like catalysts often used in petroleum hydrocarbon reactions. Its specific gravity is such that excessive heights of liquid are not required to withstand operating pressures below about 100 pounds per square inch gauge. Furthermore, it does not wet the catalyst used; it does not react chemically with the catalyst; and it does not materially vaporize at reaction temperatures in the range of 800–1,000° F. Under such conditions, the catalytic dehydrogenation, desulfurization, conversion, or the like of petroleum hydrocarbons may be successfully carried out. Normally liquid materials such as mercury, other molten metals or molten alloys, and the like may also be used.

With a material of this nature it will be apparent that there is a considerable carrying force which can be exerted on the catalyst with the result that the catalyst will be effectively carried into the inlet 27 and without the usual attrition. I estimate that a 5,000 barrel per day catalytic gas oil cracker would require about fifteen tons per hour of catalyst with a flow of about 500 cubic feet per hour. If lead is used, a 50% lead and 50% catalyst mixture flowing through the inner sealed tube 24 would require a lead circulation of about sixty-five gallons per minute. The lead pump 32 would work against a six-foot head approximately, which would require a driving motor of approximately twenty-five horse power.

It will be appreciated that adequate provision should be made for the heating of the lead reservoir to maintain the lead molten, and a suitable casing 38 is shown with provision for circulating a hot material into the casing through the line 39 with the discharge at 40. Other parts will be suitably insulated for the desired operating temperature.

The discharge operates in substantially the same manner in that the lower portion of the catalyst chamber 10 is directly connected by the inner sealed tube 42, which extends into a well 43 containing the desired amount of liquid. In a similar manner the secondary chamber 44 containing the catalyst-free liquid is in communication with the impeller 45, which circulates the liquid through the conduit 46 and thence into the lower part of the catalyst chamber 10 to complete the cycle. A valve 48 may be provided for the catalyst discharge conduit 50, and preferably the catalyst is discharged into the reactivation chamber 54 where the reactivation of the catalyst is carried out. The reactivated catalyst may be carried by conveyor 56 back to the initial feed line 23 if desired, and flue gas may be introduced into the conveyor at 57 to maintain the temperature. Vent 57a may be provided to discharge the flue gas to a stack or the like. A suitable jacket or chamber 58 is provided for maintaining the temperature of the well 43 and chamber 44 with provision made for the introduction of a heating medium at 59 and the discharge of such medium at 60.

A baffle 62 is provided in the discharge unit, which is similar to the baffle 29 in the feeding unit, and such baffle tends to separate the catalyst from the circulating liquid. This problem is not difficult, however, as the catalyst is normally of a very light weight and will float without difficulty in the relatively heavy liquid. However, any small amount of catalyst which should pass beneath the baffles 29 or 62 can be circulated without serious objection.

While I have shown a preferred form of embodiment of my invention, I am aware that modifications may be made thereto; and I, therefore, desire a broad interpretation thereof within the scope and spirit of the description herein and of the claims appended hereinafter.

I claim:

1. In combination with a catalyst chamber normally operated at a pressure other than atmospheric, means to continuously remove a finely divided catalyst from said chamber, said removing means including a receiver at the point of catalyst removal, a liquid in said receiver, said liquid being non-wetting with respect to the catalyst and being heavier than the catalyst, a conduit extending from the lower portion of the catalyst chamber to below the surface of the liquid in said receiver, and means to circulate the liquid from said receiver into the upper end of said conduit to convey the catalyst into the receiver below the surface of the liquid.

2. In combination with a catalyst chamber operated at a pressure other than atmospheric, a conduit communicating with said chamber, means to continuously pass a finely divided catalyst through said conduit, and means to seal said conduit against leakage, said sealing means including a receiver into which said conduit discharges, a liquid in said receiver, said liquid being nonwetting with respect to the catalyst and being heavier than the catalyst, the surface of said liquid extending above the discharge end of the conduit, and means to circulate the liquid from said receiver into the other end of said conduit for carrying the catalyst into the receiver below the surface of the liquid, the column of liquid in said conduit having a head sufficient to form a seal against the differential pressure between the catalyst chamber and the external atmosphere.

3. In combination with a catalyst chamber normally operated at a pressure other than atmospheric, means to continuously feed a finely divided catalyst into said chamber, said feeding means including a receiver at the point of catalyst introduction, a liquid in said receiver, said liquid being non-wetting with respect to the catalyst and being heavier than the catalyst, a catalyst hopper having a conduit extending below the surface of the liquid in said receiver, and means to circulate the liquid from said receiver into the upper end of said conduit to convey the catalyst into the receiver below the surface of the liquid.

4. In combination with a catalyst chamber normally operated at a pressure other than atmospheric, means to continuously feed a finely divided catalyst into said chamber and means to continuously remove said finely divided catalyst from said chamber, said catalyst feeding means and said catalyst removing means each including a receiver, a liquid in said receiver, said liquid being non-wetting with respect to the catalyst and being heavier than the catalyst, a catalyst collecting chamber having a conduit extending below the surface of the liquid in said receiver, jet means positioned immediately above the upper end of said conduit, and means to circulate a portion of the liquid from said receiver to said jet means for conveying the catalyst into said receiver.

5. The combination with a catalyst chamber as claimed in claim 4, in which the liquid seal comprises a molten metal which is non-wetting with respect to the catalyst and heavier than the catalyst.

6. The method of sealing a catalyst chamber in which a chemical reaction is being effected at a pressure other than atmospheric and through which a mass of finely divided catalyst is being continuously fed simultaneously with the continuous passage therethrough of vaporous reactants, which comprises passing the catalyst through a column of liquid and below the surface of a body of said liquid maintained at the points of catalyst introduction and withdrawal, said column of liquid having a head sufficient to balance the differential pressure between the chamber and the external atmosphere, said liquid being non-wetting with respect to the catalyst and being heavier than the catalyst, separating the catalyst from the liquid as it rises through the body of liquid and floats thereon, and circulating the liquid from said body of liquid to the top of said column to maintain said column of liquid in continuous motion.

7. In combination with a catalyst chamber for effecting hydrocarbon vapor phase reactions, a conduit communicating with said chamber, means to continuously pass a finely divided bauxite catalyst through said conduit, means to seal said conduit against vapor leakage comprising a moving column of molten lead therein having a head sufficient to prevent the penetration of vapors, said molten lead being non-wetting with respect to the bauxite catalyst and heavier than said catalyst, said sealing means including a receiver into which the conduit discharges, said receiver containing a body of molten lead extending above the discharge end of said conduit, and means to continuously circulate said molten lead from said receiver into a zone above said conduit whereby the bauxite catalyst is carried through the conduit by the flow of the molten lead.

AUGUST HENRY SCHUTTE.